United States Patent [19]

Watanabe

[11] 4,404,431

[45] Sep. 13, 1983

[54] AM STEREO RECEIVER

[75] Inventor: Kazuo Watanabe, Takasaki, Japan

[73] Assignee: Hitachi, Ltd., Tokyo, Japan

[21] Appl. No.: 322,684

[22] Filed: Nov. 18, 1981

[30] Foreign Application Priority Data

Nov. 21, 1980 [JP] Japan ............................ 55-163275

[51] Int. Cl.³ ............................................ H04M 5/00

[52] U.S. Cl. ................................ 179/1 GS; 455/245

[58] Field of Search ............ 179/1 GS; 455/245, 246, 455/237

[56] References Cited

U.S. PATENT DOCUMENTS

| | | | |
|---|---|---|---|
| 4,030,035 | 6/1977 | Ienaka et al. | 455/237 |
| 4,349,696 | 9/1982 | Akitake et al. | 179/1 GS |
| 4,375,580 | 3/1983 | Sauer | 179/1 GS |

*Primary Examiner*—R. J. Hickey
*Attorney, Agent, or Firm*—Antonelli, Terry & Wands

[57] ABSTRACT

In an AM stereo receiver, a sum signal L+R is generated by subjecting an IF signal to AM detection while a difference signal L−R is generated by subjecting the IF signal to PM detection. The sum signal is applied to one of input terminals of a matrix circuit while the difference signal is applied to the other input terminal via a variable gain circuit. An AM detector for obtaining the sum signal L+R includes a detecting transistor formed in a monolithic integrated circuit and an AGC voltage can be obtained by smoothing the sum signal obtained from the emitter of this detecting transistor. A level shift transistor is formed in the same monolithic integrated circuit, and a voltage virtually equal to a base input d.c. voltage of the detecting transistor of the AM detector is applied to the base of the level shift transistor so that a level shift voltage is obtained from the emitter of the level shift transistor. The variable gain of the variable gain circuit is controlled by a difference voltage between the AGC voltage and the level shift voltage, whereby change in stereo separation due to the temperature dependency of the base-emitter voltage of the detecting transistor can be prevented.

5 Claims, 3 Drawing Figures

AM STEREO RECEIVER

BACKGROUND OF THE INVENTION

This invention relates to an AM stereo receiver.

An AM stereo receiver as described in Japanese Patent Laid-Open No. 140901/1978 has conventionally been known. This AM stereo system is also referred to as an "AM-PM system" in which an amplitude modulation (AM) sum signal L+R and a phase modulation (PM) difference signal L−R are transmitted from a transmitter. The letter L stands for the left channel stereo signal and the letter R designates the right channel stereo signal.

Accordingly, a heretofore-known AM stereo receiver includes an antenna circuit, an RF amplifier stage and an intermediate frequency amplifier stage in the same way as a conventional AM radio receiver, and forms the sum signal (monaural signal) L+R by AM detecting a received signal obtained through the intermediate frequency amplifier stage. On the other hand, the difference signal L−R is formed by PM detecting the received signal. Both signals are composed (added or subtracted) in a matrix circuit to obtain a left channel stereo signal L and a right channel stereo signal R.

In the abovementioned PM detection, an AM modulation component is removed by a limiter amplifier. Consequently, the difference signal L−R formed by the PM detection has a constant level which is unaffected by the RF input field intensity $RF_{IN}$, as shown in the characteristic diagram of FIG. 1, whereas the sum signal L+R formed by the AM detection changes in proportion to the RF input field intensity $RF_{IN}$ as shown in the drawing. If both signals are directly composed by the matrix circuit, satisfactory stereo separation cannot be obtained. Hence, the difference signal L−R formed by the PM detection must be passed through a variable gain circuit which is subject to control by an AGC voltage varying in accordance with the level of the sum signal L+R, in order to realize level matching between both signals.

The inventor of the present invention has determined that the following problem arises in this case.

Namely, as shown in the characteristic diagram of FIG. 2, the above-mentioned AGC voltage $V_{AGC}$ contains an offset voltage $V_{offset}$ due to a d.c. bias voltage in a detection element, such as a transistor for the AM detecting operation. Moreover, the offset voltage $V_{offset}$ in the AGC voltage frequently corresponds to a base bias voltage of the transistor which is level-shifted by the base-to-emitter voltage of the transistor. In other words, the AGC voltage has temperature dependency in accordance with the temperature characteristic of the base-to-emitter voltage of the transistor. This results in the problem that level matching becomes difficult between the difference signal L−R and the sum signal L+R due to the temperature change, and deterioration of stereo separation occurs.

SUMMARY OF THE INVENTION

The present invention is therefore directed to provision of an AM stereo receiver which prevents deterioration of stereo separation due to the temperature change.

In accordance with the fundamental feature of the present invention, an AM detector includes a detecting transistor formed in a monolithic integrated circuit and an AGC voltage is obtained by smoothing a sum signal obtained from the emitter of this detecting transistor. A level shift transistor is formed in the monolithic integrated circuit and a level shift voltage is obtained from the emitter of the level shift transistor as a voltage which is virtually equal to the base input d.c. voltage of the detecting transistor of the AM detector is applied to the base of the level shift transistor. The variable gain of a variable gain circuit, to the input of which the difference signal L−R is applied, is controlled by a signal corresponding to the difference between the AGC voltage and the level shift voltage thus obtained.

In accordance with a preferred embodiment of the present invention, the AGC voltage in the signal source circuit and the difference voltage for controlling the variable gain of the variable gain circuit are generated independently of each other, and influences of a strong interference electromagnetic wave can be reduced.

DESCRIPTION OF THE PREFERRED EMBODIMENTS

Hereinafter, a preferred embodiment of the present invention will be described in detail.

Figure 3:
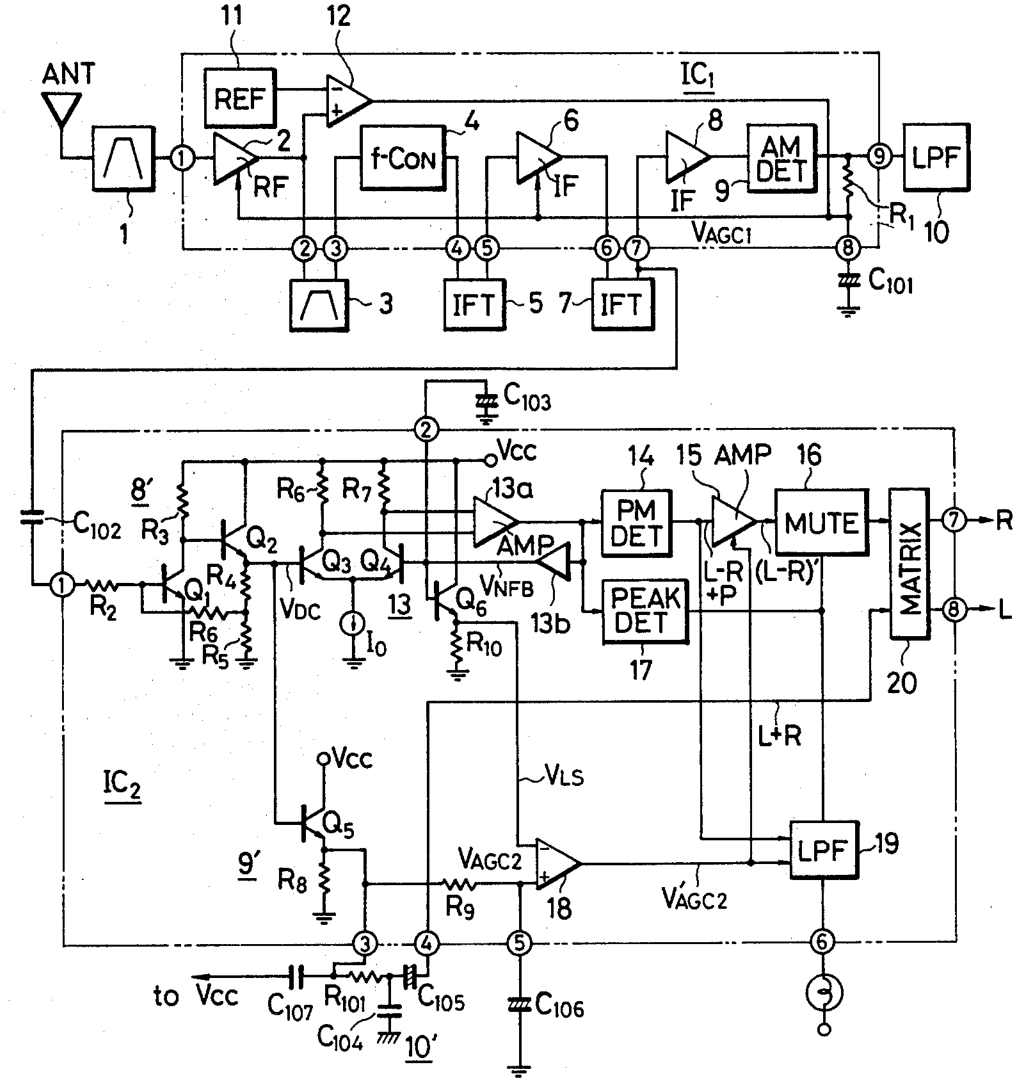
FIG. 3 is a circuit diagram of the AM stereo receiver in accordance with an embodiment of the present invention.

FIG. 3 is a circuit diagram showing an embodiment of the present invention. In this embodiment, circuit elements (circuit blocks) formed in portions $IC_1$, $IC_2$ encompassed by dash lines are formed respectively in one silicon chip by a known fabrication method of a semiconductor production. Numerals within circles represent terminal numbers of respective monolithic semiconductor integrated circuits, which are connected to external circuit networks constructed by external components via these terminals. The $IC_1$ forms a signal source circuit, which is a known monolithic semiconductor integrated circuit forming an AM radio receiver.

The radio frequency signal wave transmitted from a broadcasting station is received by an antenna ANT and is applied to a No. 1 terminal of $IC_1$ via an inter-stage frequency selector element 1. The received signal applied to this No. 1 terminal is amplified by an RF (radio frequency) amplifier stage 2 and is then applied to a frequency converter stage 4 via another inter-stage frequency selector element 3 that is interposed between the No. 2 and No. 3 terminals. Inside the frequency converter stage 4 is generated a local oscillation signal which is higher than that of the RF stage by an intermediate frequency. This local oscillation signal and the RF signal are mixed to form an intermediate frequency signal. This intermediate frequency signal is applied to a first intermediate frequency amplifier stage 6 via still another inter-stage frequency selector element 5 connected between the No. 4 and No. 5 terminals where the intermediate signal is amplified. The amplification output signal is applied to a second intermediate frequency amplifier stage 8 via an inter-stage frequency selector element 7 connected between the No. 6 and No. 7 terminals for amplification. This second intermediate frequency amplification output signal is applied to an AM detector 9. The AM detector 9 generates an AM detection output signal devoid of carrier components by means of a low pass filter 10 connected to the No. 9 terminal and produces the output from the No. 9 terminal.

A resistor $R_1$ and a capacitor $C_{101}$ connected to the No. 8 terminal together form an AGC filter, which smoothes the AM detection signal and generates an AGC voltage $V_{AGC1}$. This AGC voltage $V_{AGC1}$ is used for automatically controlling the gains of the RF amplifier stage 2 and of the first intermediate frequency amplifier stage 6.

To minimize influences of a strong interference electromagnetic wave, there are provided a reference voltage generated by a reference voltage source 11 and a voltage comparator 12 to which the output voltage of the RF amplifier stage 2 is applied. When the signal amplitude of the RF amplifier stage 2 exceeds a reference value, this voltage comparator 12 charges up the capacitor $C_{101}$ of the AGC filter by means of its detection output signal thereby to increase the AGC voltage and thus to reduce the gain of the RF amplifier stage 2.

By a drop in the gain of this RF amplifier stage 2 in cooperation with the action of the inter-stage frequency selector element, the relative level differences of the interference electromagnetic wave with respect to the received signal can be drastically reduced on the output side of the IF amplifier stage.

The detailed operation of the above-mentioned AM radio receiver is explained together with its specific circuit in Japanese Patent Publication No. 45250/1978 (U.S. Pat. No. 4,030,035). As the monolithic semiconductor integrated circuit $IC_1$ having the abovementioned construction, a product commercially available from Hitachi, Ltd., under the tradename "HA1199" may be employed, for example. On the other hand, the integrated circuit $IC_2$ forms an AM stero demodulator in accordance with this invention.

The signal at the No. 7 terminal which forms the input signal to the second intermediate frequency amplifier stage 8 in the $IC_1$ is applied to the No. 1 terminal of the $IC_2$ via a coupling capacitor $C_{102}$. The intermediate frequency signal thus received from the No. 1 terminal is amplified by an amplifier 8' in the same way as in the second intermediate frequency amplifier stage 8 in the above-mentioned $IC_1$. This amplifier 8' consists of a common-emitter amplifying transistor $Q_1$ and an emitter follower transistor $Q_2$ to the base of which the collector output of the former is applied. The emitter output signal of the emitter follower transistor $Q_2$ is subjected to voltage division by resistors $R_4$–$R_6$ and is negatively fed back to the base of the amplifying transistor $Q_1$, thereby setting its voltage gain. A load resistor $R_3$ is disposed at the collector of the transistor $Q_1$.

The output signal of this amplifier 8' is applied to the base of a detection transistor $Q_5$ forming an AM detector 9'. A resistor $R_8$ and an emitter follower AM detection capacitor $C_{107}$ are connected to the emitter of this detection transistor $Q_5$. Since a low pass filter 10' consisting of a resistor $R_{101}$ and a capacitor $C_{104}$ is connected to the emitter (No. 3 terminal) of the detection transistor $Q_5$, the carrier signal is removed from the AM detection signal.

The AM detection signal (sum signal L+R) after removal of the carrier signal is applied to the No. 4 terminal via a coupling capacitor $C_{105}$ and is delivered to one of the input terminals of a matrix circuit 20.

On the other hand, the output signal of the amplifier 8' is also applied to a limiter amplifier 13. The first stage circuit of this limiter amplifier 13 is composed of differential transistors $Q_3$, $Q_4$, an emitter constant current source $I_o$ and collector resistors $R_6$, $R_7$. A similar differential amplifier 13a is directly connected in the following stage. The output d.c. signal is fed back by a buffer amplifier 13b and a capacitor $C_{103}$ connected to the No. 2 terminal.

After the AM modulation component is removed by the above-mentioned limiter amplifier 13, the intermediate frequency amplification signal is applied to a PM detector 14 on one hand and PM detection is carried out. The PM detection signal (difference signal L−R) is level adjusted in accordance with the sum signal L+R by a variable gain circuit 15.

After the level adjustment, the difference signal (L−R) is applied to the other input terminal of the matrix circuit 20 via a mute circuit 16 disposed for stereo/monaural selection.

In accordance with this AM-PM system, when carrier disappearance is caused by a large negative peak due to over saturation exceeding 100% AM modulation index or noise, an undesirable burst noise occurs in the PM detection output and causes offensive noises. The intermediate frequency amplification signal from the limiter amplifier 13 is applied, on the other hand, to a carrier disappearance detector 17, which consists of a peak detector for detecting the presence and absence of the carrier and a delay circuit for delaying only the recovery time of the peak detection output signal. This delay circuit is used for compensating for the delay of the burst noise to the carrier disappearance timing due to the low pass filter (not shown) in the PM detecting operation. Namely, though not restricted in particular, when the FM detection is effected by an FM detection circuit using a known balanced differential multiplier or the like and the FM detection output is converted into a PM detection signal by the low pass filter, the recovery time of the burst noise integrated by the low pass filter is retarded.

The low pass filter 19, to which the above-mentioned PM detection output is applied, detects the presence and absence of a stereo pilot signal of 5 Hz, for example, inserted by the PM modulation and controls the mute circuit 16, thereby changing over stero/monaural and actuating a lamp connected to the No. 6 terminal for display of an indication of the stereo operation. However, even in the case of stereo broadcasting in which the stereo pilot signal is detected, an AGC voltage $V'_{AGC2}$ is applied to the gain control input of amplifier 15 to change to monaural reproduction with detection of the RF input field intensity if the intensity is weak and is unsuitable for stereo reproduction.

In this embodiment, the gain control voltage of the variable gain circuit 15 is generated in the following manner. The AM detection signal at the emitter of the AM detecting transistor $Q_5$ is converted into the AGC voltage $V_{AGC2}$ by the AGC filter consisting of the resistor $R_9$ and the capacitor $C_{106}$ connected to the No. 5 terminal.

On the other hand, on the basis of the concept that the feedback d.c. voltage $V_{NFB}$ in the first stage circuit of the limiter amplifier 13 is equal to the input d.c. voltage $V_{DC}$ (base d.c. voltage of the detecting transistor $Q_5$) of the AM detector 9', the feedback d.c. voltage is used for compensating for the offset voltage of the AGC voltage $V_{AGC2}$.

Namely, the above-mentioned feedback d.c. voltage $V_{NFB}$ is level shifted by an emitter follower level shift circuit consisting of the transistor $Q_6$ and the resistor $R_{10}$, thereby providing a level shift voltage $V_{LS}$ from the emitter of the transistor $Q_6$. These voltages $V_{AGC2}$ and $V_{LS}$ are applied to a voltage comparator 18 to form a difference voltage $V'_{AGC2}$ ($=V_{AGC2}-V_{LS}$), which is used as a control voltage for the gain control circuit 15.

Figure 1:
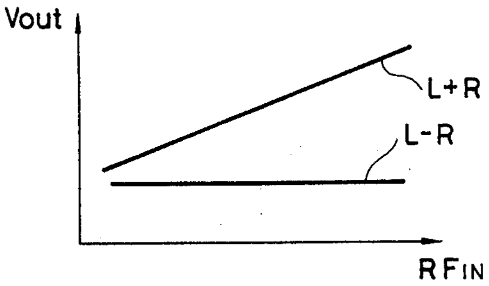
FIG. 1 is a diagram showing the level dependency of the sum signal component and the difference signal component of an AM stereo receiver due to changes in the input field intensity.
Figure 2:
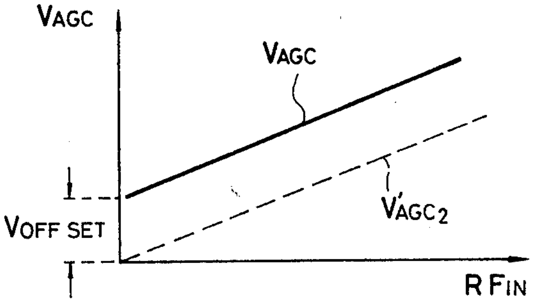
FIG. 2 is a diagram showing the change in the AGC voltage of the AM stereo receiver with the change in the input field intensity.

Accordingly, it is possible to change the difference voltage $V'_{AGC2}$ to a control voltage proportional to the AM detection signal level not having the offset voltage, as indicated by dash line in FIG. 2. Since the AM detecting transistor $Q_5$ and the emitter follower level shift transistor $Q_6$ are formed in the same monolithic semiconductor integrated circuit $IC_2$, variance in the base-emitter voltage and temperature characteristic of both transistors $Q_5$, $Q_6$ are equal to each other and are canceled by the voltage comparator 18.

Hence, the offset voltage of the variable gain control voltage can be compensated for under non-adjustment, and deterioration of stereo separation due to temperature change and element variance can be prevented.

In this embodiment, the AGC voltage $V_{AGC1}$ of the signal source circuit $IC_1$ and the AGC voltage $V_{AGC2}$ of the variable gain circuit for stereo demodulation are formed by the peculiar circuit, the interference electromagnetic wave in the signal source circuit can be suppressed. If the AGC voltage $V_{AGC1}$ is increased by the signal amplitude of the RF amplifying stage in order to suppress the interference electromagnetic wave and if the variable gain circuit 15 is to be controlled by this AGC voltage $V_{AGC1}$, level matching becomes impossible between the sum signal and the difference signal so that stereo separation is markedly deteriorated.

By constrast, in this embodiment, the variable gain circuit 15 is controlled by the AGC voltage $V_{AGC2}$, generated only by the AM detection output signal level formed by the detecting circuit 9'. Hence, the above-mentioned problem does not occur.

The present invention is not limited to the abovementioned embodiment, in particular. In a circuit in which a bias voltage is applied, via a bias resistor to the base of an AM detecting transistor for generating the sum signal, the abovementioned bias voltage may be level shifted by use of the similar emitter follower circuit or the like as a d.c. voltage for compensating for the offset voltage at its detection output.

In the AM stereo receiver which consists of two chips of monolithic semiconductor integrated circuits, a variable gain control voltage generation circuit formed by the AM detector, the level shift circuit and the voltage comparator may be disposed on the signal source circuit. If the AM detector 9 of the $IC_1$ in the above-mentioned embodiment is used as an AM detector for generating the sum signal, for instance, it is necessary to prepare two sets of AGC filters and to use one for the gain control of the RF stage and the other for the variable gain control voltage. In this case, however, if the aforementioned interference voltage preventing function is not added, only one AGC filter may be used.

Incidentally, since the monolithic semiconductor integrated circuit of the existing AM radio receiver can be used in the above-mentioned embodiment, the cost of production can be reduced.

The definite circuit of each circuit block forming the AM stereo receiver in the present invention may be optional so long as it is capable of operating in the above-mentioned manner.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In an AM stereo receiver, comprising:

a signal source circuit for producing a signal containing an amplitude modulation sum signal component and a phase modulation difference signal component;

an AM detector circuit connected to receive said signal from said signal source circuit for generating a signal proportional to said amplitude modulation sum signal component, including a detecting transistor formed in an integrated circuit;

a PM detector circuit connected to receive said signal from said signal source circuit for generating a signal proportional to said phase modulation difference signal component;

a variable gain circuit connected to receive said signal proportional to said phase modulation difference signal from said PM detector circuit;

a matrix circuit connected to receive the outputs of said AM detector circuit and said variable gain circuit for generating stereo reproduction signals by composing said signal proportional to said sum signal component and said signal proportional to said difference signal component received via said variable gain circuit;

means for producing an AGC voltage in response to said sum signal component obtained from said detecting transistor of said AM detector circuit;

a level shift transistor formed in said integrated circuit in which said detecting transistor is formed;

means for applying a voltage virtually equal to the base input d.c. voltage at the base of said detecting transistor to the base of said level shift transistor, thereby providing a level shift voltage from the emitter of said level shift transistor; and means for controlling the gain of said variable gain control circuit by a signal equal to the difference between said AGC voltage and said level shift voltage.

2. The AM stereo receiver as defined in claim 1, which further includes:

a limiter amplifier having a signal input terminal connected to the base of said detecting transistor, a negative feedback input terminal connected to the base of said level shift transistor and an output terminal connected to the input terminal of said PM detector; and a d.c. negative feedback circuit interposed between said output terminal and said negative feedback input terminal of said limiter amplifier in such a manner as to cause the voltage at said negative feedback input terminal of said limiter amplifier to be virtually equal to the base input d.c. voltage of said detecting transistor.

3. The AM stereo receiver as defined in claim 1 or 2, wherein said signal source circuit includes an RF amplifier stage, a frequency converter stage connected to said RF amplifier stage, an IF amplifier stage connected to said frequency converter stage, another AM detector connected to said IF amplifier stage, an AGC filter for controlling the gains of said RF amplifier stage and said IF amplifier stage in response to the detection output signal of said another AM detector, and voltage comparator means for comparing the signal amplitude value of the output of said RF amplifier stage with a reference value, and when the signal amplitude value of said RF amplifier stage exceeds the reference voltage, for applying an output signal to said AGC filter to lower the gain of said RF amplifier stage.

4. An AM stereo receiver as defined in claim 1, wherein said means for producing said AGC voltage includes a filter circuit connected between the emitter of said detecting transistor and said gain controlling means.

5. An AM stereo receiver as defined in claims 1 or 4, wherein said gain controlling means includes a comparator having one input connected to receive said AGC voltage and a second input connected to receive said level shift voltage, the output of said comparator being connected to control the gain of said variable gain circuit.

* * * * *